Patented June 4, 1940

2,203,380

UNITED STATES PATENT OFFICE 2,203,380

POWER OPERATED AUTOMOTIVE GEAR SHIFTER

Philip M. Carter, White Plains, N. Y., Douglas F. Linsley, Norwalk, Conn., and Louis A. Larsen, Brooklyn, N. Y., assignors to Vaco Products, Inc., a corporation of Delaware Application December 31, 1935, Serial No. 56,848

7 Claims. (Cl. 192—3.5)

The present invention relates to a novel and improved power operated gear shifting mechanism for the transmission of an automotive vehicle, and more particularly to such a mechanism which is adapted to be operated by the suction developed in the intake manifold of the driving internal combustion engine.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, construction, arrangements, combinations and improvements herein shown and described.

The accompanying drawings, referred to herein and constituting a part hereof, illustrate one embodiment of the invention, and together with the description, serve to explain the principles of the invention.

The present invention has for its object the provision of a novel and improved gear shifting device for the transmission of an automotive vehicle. A further object is the provision of an automotive, power-operated gear shifting device which is reliable and certain in its operation, relatively simple in its construction, and which performs all of the desired functions to give an unusually high degree of flexibility of operation. Another object is the provision of an automatic gear shifting mechanism to be operated by fluid pressure and having a selector valve controlling the application of fluid pressure for shifting the transmission gears and in which the movement of the selector valve to all of its positions is controlled by the application of fluid pressure to devices associated with the selector valve. Still another object is the provision of a fluid pressure controlling selector valve which is moved in both directions by fluid pressure applied under control of a valve distinguishing between the vehicle in motion and the vehicle at rest.

The present invention also provides a mechanism in which the shifting of the gears is carried out automatically by power in accordance with a predetermined schedule after this schedule has been put in effect by the setting of the vehicle in motion, although the schedule can at any time be superseded by the will of the operator. There is also provided an automatic fluid pressure gear shifting device in which the fluid pressure is applied to double-ended cylinders and the venting of the cylinders is automatically and pneumatically controlled. The invention also provides such a mechanism in which the fluid pressure is the suction developed at the intake manifold of the internal combustion engine driving the automobile. The invention further insures against faulty operation of the mechanism when a backfire occurs through the carburetor of the engine.

In accordance with the illustrative embodiment of the invention the gear shifting mechanism comprises a unit to be positioned above and at the sides of the transmission gear box of the automotive vehicle, which gear box contains the selectively shiftable sliding transmission gears by which power is transmitted at different gear ratios from the internal combustion engine to the vehicle driving wheels. As illustrated, the unit is adapted to shift the gears to any one of the forward speeds, to reverse or to neutral, and is operated by the vacuum developed at the intake manifold of the internal combustion engine. A pair of double-ended cylinders are provided, one at either side of the gear box, and the pistons of these cylinders are individually connected to the gear shifting forks of the conventional gear box. These pistons each have three positions, corresponding to neutral and on either side of neutral to a speed position, so that by movement of one piston in one direction or another, the transmission gears may be selectively moved into proper meshing relation for the desired gear ratio. The application of fluid pressure to the pistons is controlled by means of a selector valve mounted on the unit and this valve is operatively connected to a fluid pressure piston operating in a small cylinder by which it may be moved by this pressure to its various positions. For selectively venting the cylinders so that they may move freely as fluid pressure is applied to them and at the same time for keeping the other cylinder ends tightly sealed, automatic venting valves are provided which are operated by the fluid pressure applied to the operative end of the operative cylinder, and these valves may be conveniently of the type and construction shown in the patent to Douglas F. Linsley, No. 1,733,502, granted October 29, 1929.

The selector valve is urged towards one or the other of its end positions by means of fluid pressure and the direction of this movement is controlled by a centrifugally operated controlling valve distinguishing between movement of the vehicle and the vehicle at rest, while the selector valve is releasably held in an intermediate position until the gears are shifted to an intermediate speed. Thus, when the vehicle is set in motion with the gears in first speed position, the selector valve is urged by fluid pressure to its high speed position, but is releasably held in intermediate speed position until the gears have been shifted by fluid pressure to the intermediate speed, after the valve moves to high speed position and later permits the gears to be shifted to high speed position at the proper time, as when the clutch is next disengaged. Means are also provided for positioning the selector valve by fluid pressure in its intermediate speed position from either of its other positions so that the operator has complete control at all times over the performance of the vehicle and can cope with traffic conditions as fully as though the transmission were manually operated.

With a gear shifting device operated by the suction developed in the intake manifold of the internal combustion engine, it has heretofore been found that its operation is not always consistent and is frequently the exact opposite of the intended operation, and this apparently erratic operation has proved baffling in the past. However, we have found that this erratic operation is occasioned by backfiring of the engines through the intake manifold when the engine is overheated or an intake valve is sticky or otherwise slow in its operation, or when the engine is cold. Under these conditions, instead of suction being available at the intake manifold, the air is under pressure and instead of the gears being shifted, for instance, into second speed they are shifted into high speed, or into reverse instead of into first speed. In the present embodiment, means are provided for preventing such faulty operation, thereby insuring proper operation at all times.

For shifting the gears into neutral position and also into reverse, valve means are provided in series with the selector valve when the selector valve is in first speed position and this series valve may be manually moved to either forward, neutral or reverse position according to the operation desired. Means are also provided for permitting the gear shifting mechanism to be manually operated in case of an emergency and other means are provided for interlocking the gear shifting rods so that only one gear shifting rod may be moved from neutral position at a time.

It will be understood that the foregoing general description and the following detailed description as well, are exemplary and explanatory of the invention, but are not restrictive thereof.

Figures 1, 4, 12:
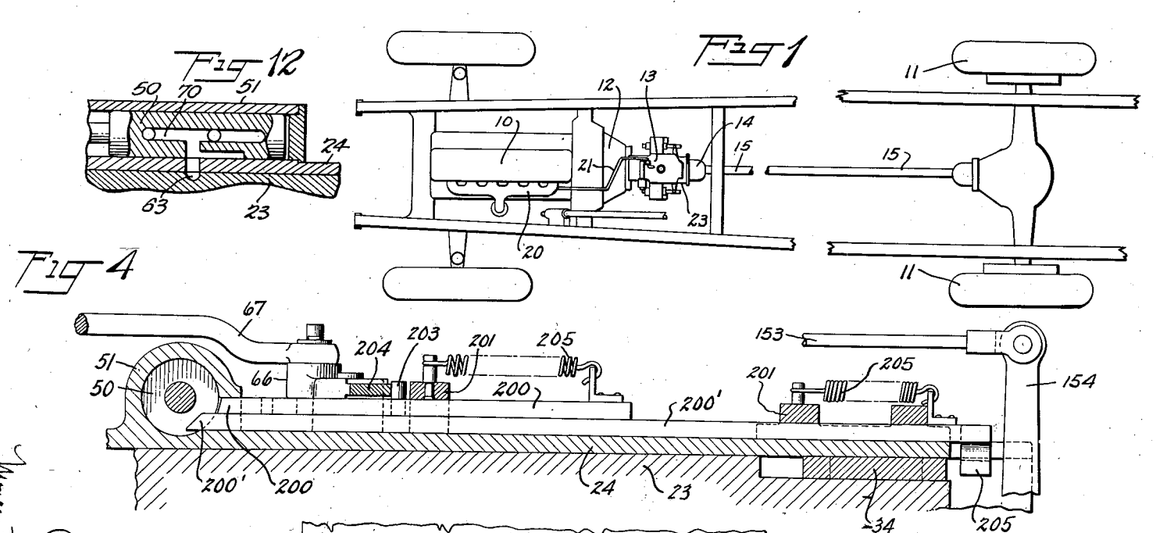
Fig. 1 is a diagrammatic plan view of an automotive vehicle embodying the present invention.
Fig. 4 is a longitudinal vertical section taken on the line 4—4 of Fig. 2.
Fig. 12 is a detailed fragmentary sectional view taken on line 12—12 of Fig. 3 showing a longitudinal section of the selector valve.
Figure 2:
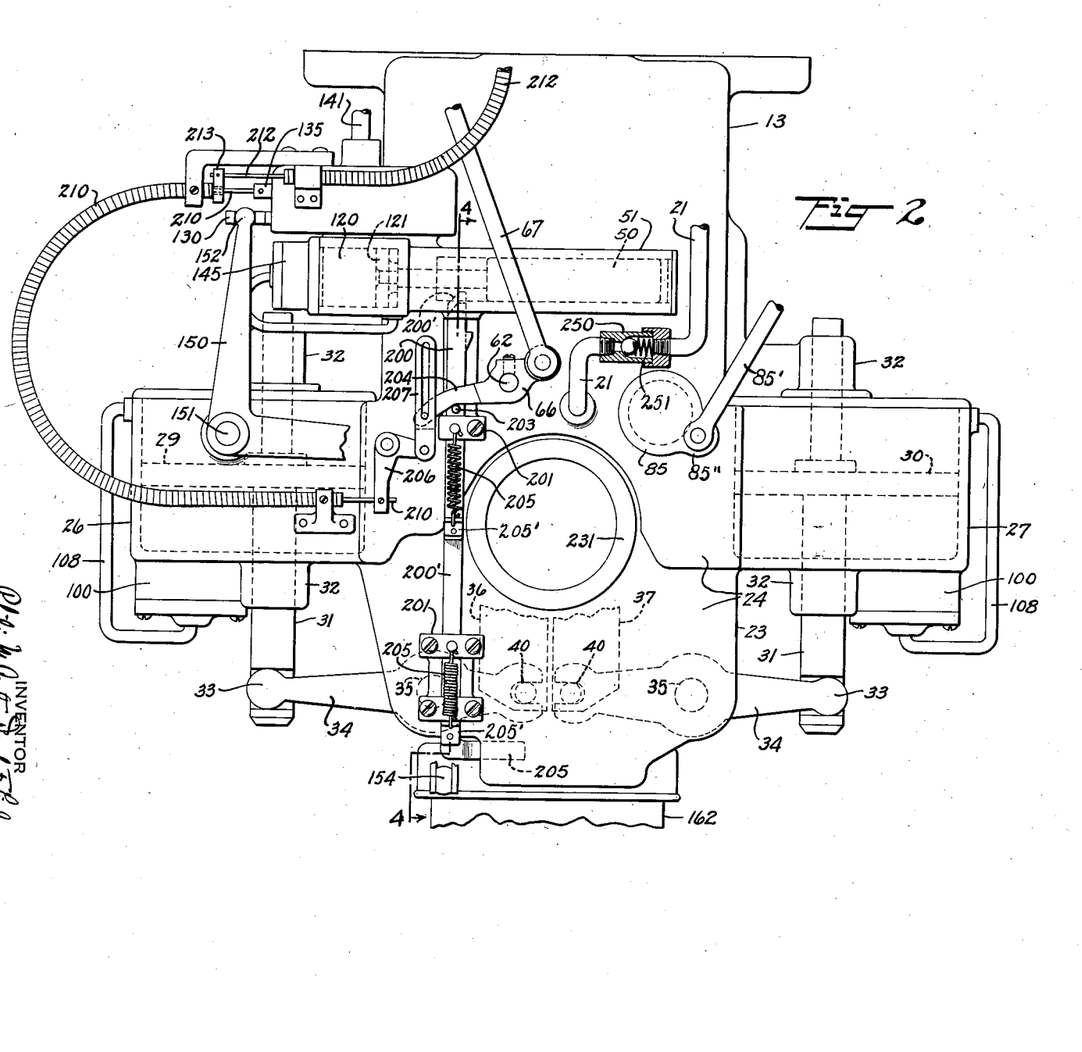
Fig. 2 is a top plan view of an illustrative embodiment of the present invention as applied to a conventional form of automotive, selective, sliding-gear transmission.

Referring now in detail to the illustrative embodiment of the invention, as disclosed in the accompanying drawings, there is provided a conventional type of internal combustion engine 10 adapted to drive the traction wheels 11 of the automotive vehicle through the clutch 12, sliding gear selective transmission 13, universal joint 14 and propeller shaft 15, these parts being of substantially conventional construction. As illustrated, there are provided three forward speeds and reverse and the gears of the transmission may be positioned in neutral.

Fluid pressure operated means are provided for shifting the gears from one speed to another and these means are preferably powered by suction derived from the intake manifold 20 of the internal combustion engine. For this purpose a pipe 21 is connected to the intake manifold and to the shifting mechanism. The shifting mechanism is preferably constructed as a unit and is mounted on the top of and at the sides of the transmission gear box 23 and comprises a plate 24 removably secured to the top of the gear box and forming a cover therefor and supporting the gear shifting, double-ended cylinders 26 and 27, one at either side of the gear box. In each of these cylinders is reciprocably mounted a piston 29 or 30, slidably journaled by means of its piston rod 31 which passes through the stuffing boxes 32 at each end of the cylinders and at one end is notched to receive the rounded end 33 of a lever 34 connected to its gear shifting rod 36 or 37 by means of the pin and forked end connection 40. Levers 34 are pivoted at 35 between plate 24 and the top of the box 23. Shifting rods 36 and 37 are connected in the conventional manner to the gear shifting forks of the selective, sliding gear transmission, which is preferably of the synchronized type and may use either helical or spur gearing. Shift rod 36 serves to shift the gears from neutral to second (intermediate) or third (high) speed position, while gear shifting rod 37 serves to shift the gears from neutral to first (low) speed or reverse position.

Means are provided for preventing either of the shift rods from moving away from neutral position unless the other shift rod is in neutral position, and for this purpose an interlocking bolt 44 is slidably mounted between the shift rods and is adapted to enter alternatively one or the other of the recesses 45 in the adjacent sides of the shift rods. Resilient detents are also provided for definitely positioning and yieldably holding the shift rods in positions corresponding to full gear meshes and for this purpose the resilient detents 48 are adapted to enter notches 49 in the outer sides of the shift rods, notches 49 being spaced similarly to the gear meshing positions of the shift rods.

Ducts are provided for connecting the ends of the cylinders 26 and 27 with the pipe 21 and through it to the source of fluid pressure 20, and the application of suction to one or the other of these ducts and cylinder ends is controlled by means of a selector valve. The selector valve comprises a slidable and substantially cylindrical valve plunger 50 which is seated in the valve body 51 formed as an upper part of the plate 24 and lies at right angles to the shift rods 36 and 37. Pipe 21 is connected by means of a fitting to the main duct 60 formed in the plate 24, which duct forms one of the ports of the rotatable clutch-controlled valve 62, while the other port of this valve is the main duct 63 leading from the valve to the selector valve body 51. The clutch controlled valve 62 is formed with a communicating port 65 adapted to connect the ducts 60 and 63 only when the clutch pedal is fully depressed. Valve 62 is operatively connected with the clutch pedal by means of the bell crank 66 which is fixed to the valve 62 and is also connected to link 67.

Figure 9:
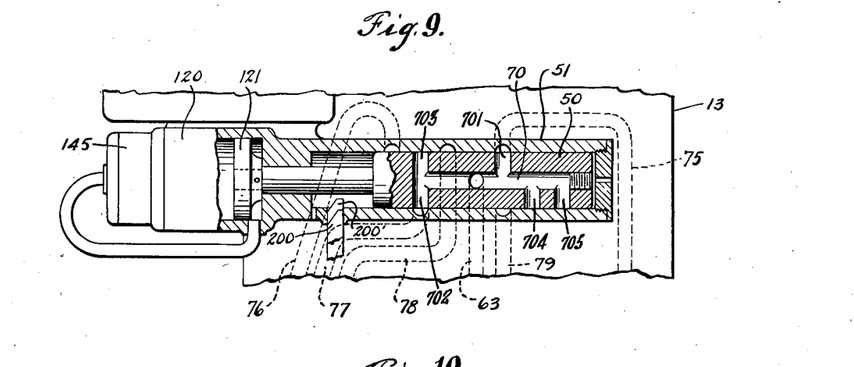
Figure 10:
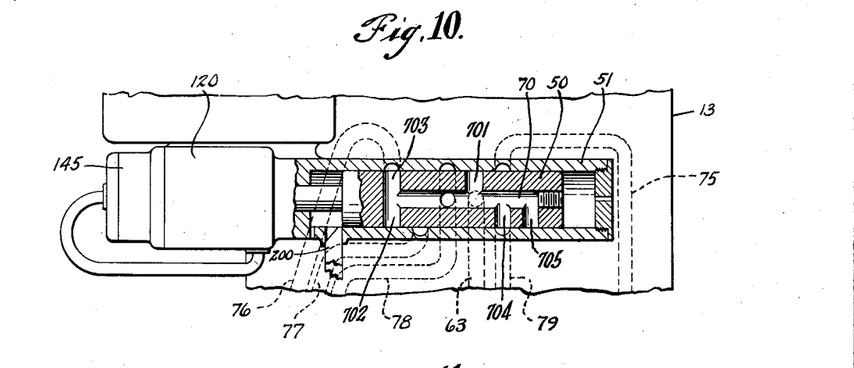
Figure 11:
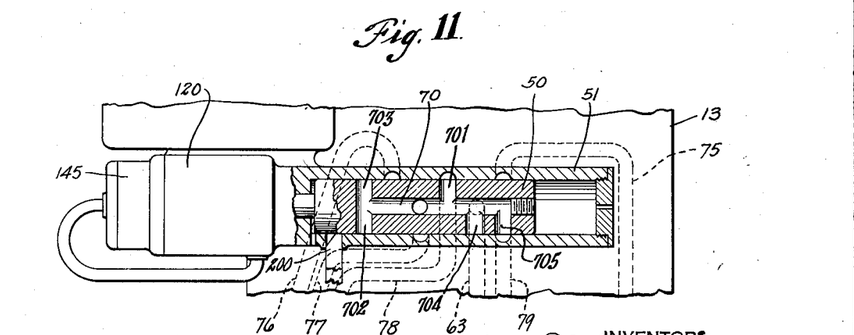

The internal ducts of the selector valve 50 and their relation to the various selector valve ports are shown in detail by Figures 9, 10 and 11.

The main suction duct 63 opens into and is always in communication with the centrally extending duct 70 which communicates with radially extending ducts, including the duct 701 for first, reverse, neutral and third speed actuation, duct 702 for neutralizing piston 29 when shifting to first, neutral or reverse, duct 703 for shifting to second speed, duct 704 for neutralizing the piston 30 when shifting to second speed, and duct 705 for neutralizing piston 50 when shifting to third speed position.

Ducts 701 and 702 register with ports 75 and 77 respectively in first speed position; ducts 703 and 704 register with ducts 76 and 79 respectively in second speed position, while ducts 701 and 705 register with ducts 78 and 79 respectively in third speed position.

The various ducts, 75, 76, 77, 78 and 79 may, for convenience, be designated as follows:

Reverse, optional neutral and first speed duct 75.

Automatic neutral ducts 77 and 79.

Second speed duct 76.

Third speed duct 78.

Duct 75 may be connected through the reversing valve 85 to either the rear end of cylinder 27 for first speed through duct 83, to the central portion of cylinder 27 for neutral through duct 82, or to the forward end of cylinder 27 for reverse through duct 80.

With the valve 85 in forward position, duct 79 is connected through valve port 86 to duct 81 which also communicates, in common with duct 82, with the central portion of cylinder 27. With the valve 85 in reverse position, duct 75 is connected to duct 80 and suction is applied while the valve 50 is in first speed position, piston 29 is held in its central position by interlock 44 and ducts 81, 82 and 83 are closed by valve 85. Thus the gears can be shifted out of reverse only by moving valve 85 which may be accomplished by manipulation of the link 85' pivotally connected to a lug 85'' projecting from the upper portion of valve 85.

Duct 76 is connected with the front of cylinder 26 and when suction is applied to this duct, the piston 29 is moved forward to shift the gears into second speed, while duct 78 is similarly connected to the rear of cylinder 26 to move the gears to high speed position. Duct 77 is connected to the central portion of the cylinder and when suction is applied through it, shift rod 36 is moved to its neutral position.

Figure 3:
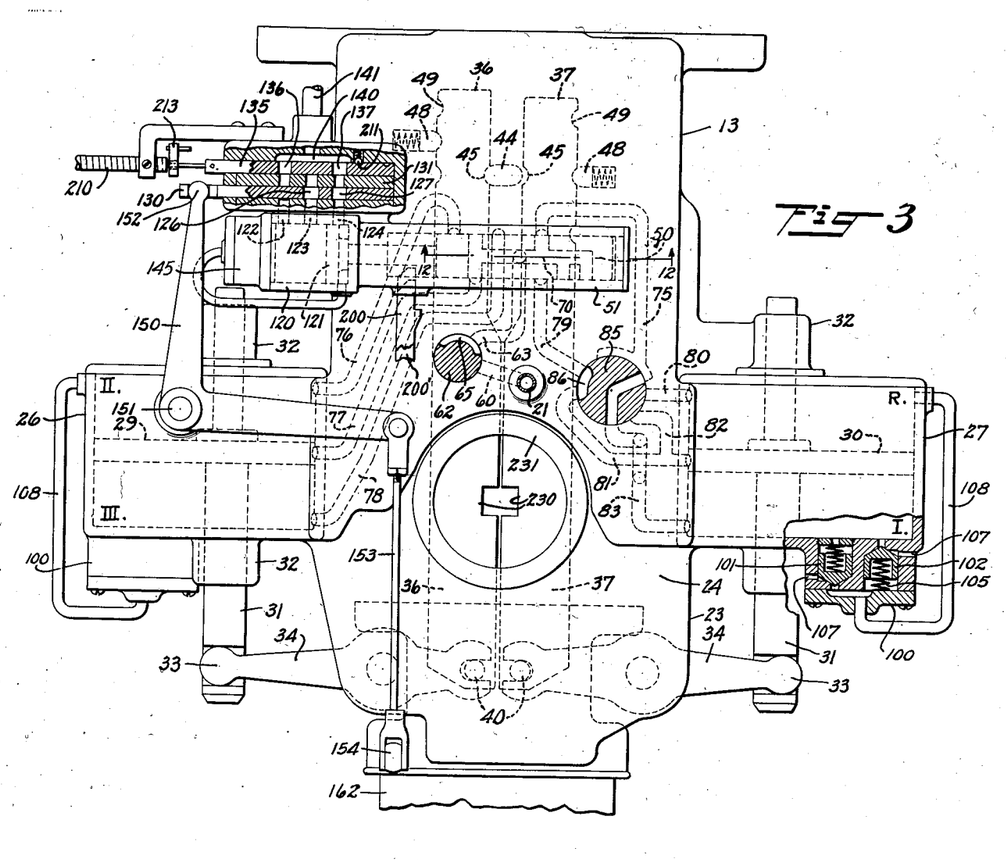
Fig. 3 is a similar view with certain parts removed and other parts shown in section.
Figure 5:
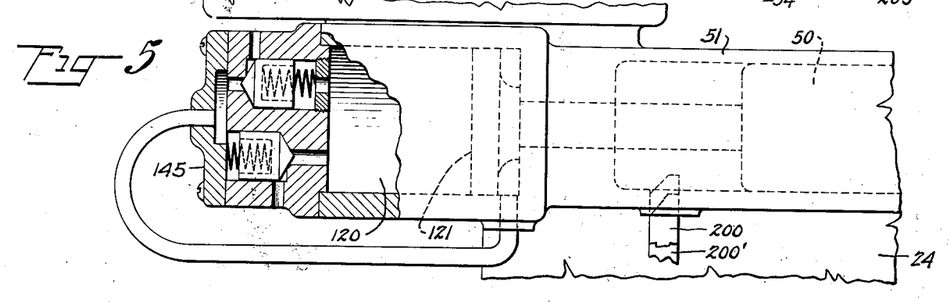
Fig. 5 is a fragmentary detailed view, partly in section, of one end of the actuating mechanism for the selector valve.

With the selector valve in the position shown in Figure 3, vacuum is applied to ducts 75 and 77, and with the reversing valve 85 in the forward position as shown, vacuum is applied through duct 83 to the rear end of cylinder 27 and to the central portion of cylinder 26 through duct 77. This application of suction insures that rod 36 is in its neutral position and when it is so positioned piston 30 moves rearwardly to move the shift rod 37 to first speed position.

For shifting the gears to second speed position, the selector valve is moved slightly to the left, placing duct 63 in communication with the ducts 79, 81 and 76 so that piston 30 is moved to the central portion of its cylinder by vacuum applied through duct 81, and piston 29 is moved forward to shift rod 36 to second speed position by means of vacuum applied through duct 76.

For shifting the gears to high speed position, the selector valve is moved even further to the left placing duct 63 in communication with ducts 79 and 78. The application of vacuum insures that piston 30 is in its neutral position and thereafter piston 29 is moved rearwardly to shift rod 36 to high speed position.

With the selector valve in the position shown in Figure 3, the gears may be shifted to either neutral position or reverse by movement of the reversing valve 85. When connected to duct 82 the piston is moved to neutral position, while when connected to duct 80 the piston is moved forwardly to reverse position, and during any of these movements piston 29 is held in neutral position by vacuum applied through duct 77.

In order to accelerate the movement of the pistons 29 and 30 and to reduce the amount of power required for their movement, venting means are provided for admitting air to the side of the piston opposite the side to which suction is applied. These means are preferably similar in construction and operation to the automatic fluid pressure operated venting valves disclosed in the patent to Douglas F. Linsley, No. 1,733,502.

As embodied, these automatic venting valves 100 are groups in pairs, one pair being provided for each of the cylinders 26 and 27, and are preferably mounted on the rear ends of the cylinders. Each pair comprises two valve plungers 101 and 102, positioned oppositely to each other and seated in cylindrical apertures. They are resiliently urged to closed position by means of springs 105.

Each of these valve plungers comprises a relatively large head and a relatively small seat. The head of each valve is connected to the interior of one cylinder end, while the seat is connected to the interior of the other cylinder end and to a vent 107. For convenience, a pipe 108 serves to connect the forward end of the cylinder with the head of one valve and the seat of the other. When suction is applied to one end of the cylinder, it is also applied to the valve for venting the other end of the cylinder and opens this valve by lifting it from its seat to admit air through vent 107 to the interior of the cylinder.

Thus when suction is applied to the forward end of the cylinder, this suction is also applied through pipe 108 to the head of the right hand valve 102, lifts this valve from its seat and admits air to the rear of cylinder 27 through the right hand vent 107. At the same time, the suction applied through pipe 108 does not unseat valve 101 and no air can leak into the line 108 to impair the vacuum being applied to the forward end of cylinder 27.

Fluid pressure means are provided for moving the selector valve from one position to another and for this purpose there is provided a small cylinder 120 at one end of the selector valve plunger 50. In this cylinder is slidable a small piston 121 connected directly to the selector valve plunger so that movement of the piston causes a corresponding movement of the selector valve plunger. This powered movement of the selector valve is controlled by means of valves which may be mounted directly adjacent to and on the side of the cylinder 120.

Cylinder 120 is provided with ports 122, 123 and 124, one at either end and one at its central portion, and these ports communicate with valve openings 126 and 127 in the valve slide 130. Valve slide 130 is mounted between a flat surface on one side of the cylinder 120 and a flat surfaced spacing plate 131 which is provided with three ducts positioned similarly to the ports 122, 123 and 124. Against the other side of spacing plate 131 is another valve slide 135 provided with two openings 136 and 137, opening 136 being adapted to communicate with port 122 while opening 137 is adapted to communicate with port 123 or port 124 depending on the position of slide 135. On its other side, slide 135 is in communication with an elongated duct 140 which communicates with a pipe 141 connected directly to the intake manifold 20 or to the pipe 21.

In the position shown in Figure 3, suction is applied through pipe 141, duct 140, openings 137 and 127 to port 124 to move piston 121 to the extreme right. With the valve slide 130 in its other position, to the left of that shown, and with slide 135 in the position shown, suction is applied to the left end of piston 121 through openings 136, 126 and port 122, tending to move the piston 121 to high speed position. By moving the valve slide 135 to the left of its illustrated position, and with valve slide 130 in either of its two positions, suction is applied through openings 137 and 126 or 127 to port 123 to move the piston 121 to its central position from either of its extreme positions, thereby positioning the selector valve 50 for second speed application of vacuum to the pistons 29 and 30.

A pair of automatic fluid pressure operated venting valves 145 are provided for venting the cylinder 120 and as these are duplicates, except as to size, of those previously described their description will be omitted.

For automatically controlling the movement of the selector valve 50 in both directions under the power of the piston 121, means are provided responsive to movement of the vehicle for shifting the valve slide 130 from one position to another. Heretofore, it has been proposed to use centrifugal governors which are speed responsive for controlling the shifting operations, but such governors have proved to be unsatisfactory from many points of view. Such a suitable centrifugal governor is necessarily relatively expensive and must be made accurately, is a source of vibration and in order to obtain a sufficient amount of power to operate the selector valve it must be unduly heavy and bulky or must be driven at a relatively high speed. Furthermore, a governor is of necessity balanced against a spring and thus is unreliable in its operation and too delicate in its adjustment.

In accordance with the present invention, the selector valve is preferably controlled by means of a centrifugal controller which does not distinguish between different vehicle speeds, but distinguishes only between the vehicle at rest and the vehicle in motion, and is moved to its final position when the vehicle is travelling only one or two miles per hour.

This centrifugal controller is operatively connected with the valve slide 130 by means of bell crank 150 pivoted on the upper portion of cylinder 26 by pivot 151 and has its rounded end 152 seated in a notch in the end of valve slide 130. The other end of bell crank 150 is connected to link 153 which in turn is connected to a lever 154 operated by the controller.

Figures 6, 7, 8:
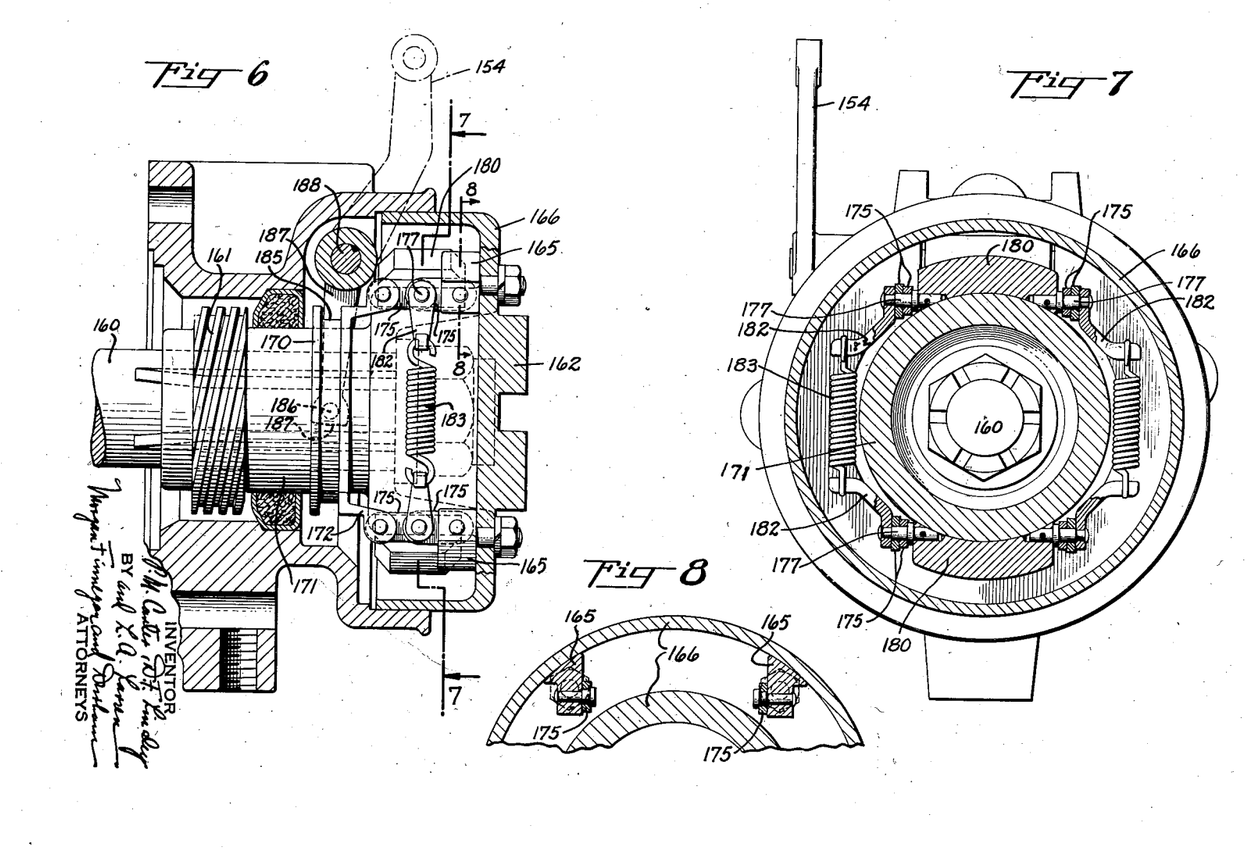
Fig. 6 is a detailed longitudinal, vertical sectional view of the centrifugal controller of the present embodiment.
Fig. 7 is a cross-sectional view taken on the line 7—7 of Fig. 6.
Fig. 8 is a similar, fragmentary sectional view taken on the line 8—8 of Fig. 6; and, Figs. 9, 10 and 11 are detailed sectional views of the selector valve in first, second and third speed positions respectively.

The controller is shown in detail in Figures 6, 7 and 8 and is preferably mounted on the propeller shaft 160 at the rear of the transmission gear box and intermediate the speedometer drive gear 161 and the forward half of the universal joint 162. While many different forms of controllers may be used, the present embodiment comprises a plurality of brackets 165, each partially surrounding the propeller shaft 160 and bolted to a cup 166 which may be formed integrally with the universal 14. A collar 170 is slidably fitted around the splined female socket 171 of the universal and is provided with rearwardly extending lugs 172 corresponding with the forwardly projecting brackets 165. Pivotally mounted between each pair of lugs and brackets and extending parallel to the shaft 160 are toggle links 175, pivotally interconnected at their mid-portion by pivot pins 177 which are secured in the arcuate centrifugal weights 180. These weights have their outer surfaces concentric with and of the same curvature as the inner surface of cup 166, while the inner curved surface of the weights is similar to the socket 171. Pivot pins 177 also support hooks 182, to the outer ends of which are connected the ends of tension springs 183 against which the weights are moved radially outward by the centrifugal force of their rotation.

When the vehicle is in motion, the propeller shaft 160 rotates and the centrifugal weights are moved radially outward to shorten the toggle 175 causing a rearward movement of the collar 170. On its exterior, collar 170 is formed with an annular groove 185 in which is seated the diametrically opposed pins 186 carried by the ends of fork 187 which is pivotally mounted by means of shaft 188 and by this shaft is connected to arm 154. By these means, outward movement of the weights 180 causes a forward movement of the lever 154, and a movement to the left of valve slide 130, this movement being sufficient to cause openings 126 and 127 to register with ports 122 and 123 respectively.

Means are provided for preventing movement of the selector valve from its low speed position directly to its high speed position, so that the gears will be shifted into second speed as the vehicle is accelerated. For this purpose, the left hand end of the selector valve plunger 50 is of reduced diameter and latches 200 and 200' project through one wall of the valve body 51. Latches 200 and 200' and the end of the plunger are so positioned that when the plunger end is sucked against either latch, the selector valve is in second speed position. The latch bars 200 and 200' are slidably mounted in guides 201 on the top of plate 24, and are normally held in plunger engaging position by springs 205 tensioned between guides 201 and the lugs 205' fast on the upper surfaces of the latches, but latch 200 is withdrawn from this position by engagement of the clutch, while latch 200' is withdrawn by shifting of the gears into second speed position. For withdrawing the latch 200 by engagement of the clutch, a pin 203 projects upwardly from the rod and is adapted to be engaged by rearward movement of the end 204 of bell crank 66 so that the valve plunger 50 may move when the clutch is fully disengaged. Shifting of the gears to second speed position causes the end of second and third speed lever 34 to engage the bent end 205 of latch bar 200' and thus retract this latch, and when both latches have been retracted, the valve can move to high speed position.

Latches 200 and 200' preferably do not force the selector valve to shift the gears into second speed as the vehicle is slowed but allow the selector valve 50 to move to first speed position through second speed position, and thus the operator remains in high speed until he declutches while bringing the vehicle to a stop, at which time the gears are shifted to first speed position.

The optional second valve slide 135 is also manually operated and may be conveniently connected to the clutch pedal by means of wire 210, or to a control button on the dash panel. If connected to the clutch pedal, the connection is preferably such that an overthrow of the clutch pedal, beyond its normal declutching position, is required to move the slide valve to its left hand position, thus positioning the selector valve plunger for second speed, regardless of vehicle speed.

This overflow of the clutch pedal causes bell crank end 204 to swing bell crank lever 206 counter-clockwise by means of link 207 and thus move wire 210 to pull valve slide 135 to the left and into second speed position. Valve slide 135 is held in either of its positions by means of the ball check 211 and may be returned to its normal position, either by complete engagement of the clutch or by pulling on the wire 212 connected to ferrule 213 surrounding wire 210 and freely movable therealong.

Means are also provided for permitting the use of a manual gear set lever whenever desired, as in case of a failure of the vacuum. For this purpose, the shift rods 36 and 37 are notched, as usual, at 230, and a socket 231 is provided in the top of the transmission casing, which socket may be normally closed by a cover plate, not shown. For emergency operation, the cover plate is removed, exposing the socket and permitting the insertion of the gear set lever for operation of the shift rods 36 and 37 in the conventional manner. Faulty operation caused by backfiring of the engine is prevented by means of the ball check valve 250 in the main vacuum line 21, this valve being closed by its spring 251 on any substantial reduction in intake manifold suction.

The operation of the illustrated embodiment may be summarized as follows:

After the engine has been started, vacuum is applied to the shifting mechanism through pipe 21 and to the selector valve operating cylinder through pipe 141. The selector valve is held by suction in the position shown in Figure 3 and with the reversing valve in the position shown in Figure 3, the clutch pedal is depressed disengaging the clutch and opening the valve 62 to apply vacuum through the selector valve to ducts 75, 83 and 77. This application of vacuum neutralizes the piston 29 and applies suction to the rear of piston 30. Automatic valve 101 is opened to vent the forward end of cylinder 27, and the piston 30 moves rearwardly, shifting the rod 37 forwardly and meshing the gears in first speed position.

The operator then engages the clutch, closing valve 62, opens the throttle and the vehicle gains speed. This movement of the vehicle rotates the weights 180, moving the slide 130 to its left hand position, applying suction to the left end of piston 121 through opening 126 and port 122. Selector valve plunger 50 is moved to the left until it engages latch 200' where it stops.

The mechanism next comes into operation when the operator declutches, opening the valve 62 and applying suction to the selector valve, through which it is applied to ducts 79 and 76. Vacuum returns piston 30 to its central position, unmeshing the first speed gears, and when this has been accomplished, interlock 44 permits the suction applied to the forward end of piston 29 to move that piston and mesh the gears in second speed position. This unlatches bar 200', but the valve is held in second speed position by latch 200 until the clutch is engaged and latch 200 is thereby released, permitting vacuum applied to piston 121 to move the selector valve plunger 50 to its extreme left-hand position. The operator again accelerates further as desired, and when sufficient speed has been attained, again disengages the clutch opening valve 62 and vacuum is applied through the selector valve and duct 78 to shift the gears to high speed position. As the piston is moved, the forward portion of cylinder 26 is vented by the automatic valve, and piston 30 is centered by vacuum applied through duct 81.

When the operator stops the vehicle, valve slide 130 is moved to its original (right) position, applying suction to the right end of piston 121 and returning the selector valve plunger to its original position, so that if or when the clutch is disengaged, vacuum is applied through duct 77 to center the piston 29 and unmesh the positive drive of the transmission in high speed, and also apply suction to the rear side of piston 30 through ducts 75 and 83.

If the operator desires to start in second speed or desires to shift from high to second speed, as in ascending a steep grade, valve slide 135 is moved to the left by operation of pull wire 210 by clutch disengagement, and suction is applied through opening 137, through opening 126 or 127 and through port 123 to center the piston 121 in second speed position. The gears are shifted to second speed position, as with the automatic shift, and remain in second speed until the clutch is next disengaged at which time they are shifted to third speed position if the vehicle is moving, or are shifted to first speed if the vehicle is at rest.

If the operator desires to shift the gears to reverse, reversing valve 85 is moved counter-clockwise until suction may be applied to duct 80. The clutch is then disengaged, applying suction through the first speed port of the selector valve to duct 75 and through reversing valve 85 to duct 80 moving piston 30 forwardly. During this movement, automatic venting valve 102 is opened to vent the rear end of cylinder 27. Due to the fact that the selector valve is moved from first speed position as soon as the vehicle is set in motion, either forward or reverse, the gears cannot be shifted into reverse while the vehicle is moving forward, and vice versa, but the operator need not wait until the vehicle has stopped before shifting the valve 85.

For positioning the gears in neutral, the operator moves the reversing valve until it is connected to duct 82 and then by disengaging the clutch, suction is applied to duct 82 to center the piston 30 from either first or reverse position.

one or the other of the automatic valves 101 and 102 being operated depending on the position from which the piston is moved.

The invention in its broader aspects is not limited to the specific mechanisms shown and described but departures may be made therefrom within the scope of the accompanying claims without departing from the principles of the invention and without sacrificing its chief advantages.

What we claim is:

1. In a fluid pressure operated gear shifter, the combination of a clutch actuating member, a master valve operated thereby, a fluid pressure operated gear shifting member, a selector, said selector and master valve controlling the application of vacuum to the gear shifting member, means for moving the selector to several positions, a controller actuated in accordance with vehicle speed and means for controlling the operation of the selector moving means by the conjoint action of the clutch actuating member, gear shifting member and controller.

2. In an automotive vehicle, transmission gear shifting mechanism including in combination fluid pressure operated pistons operating in cylinders to selectively shift the transmission gears, a selector valve controlling the application of vacuum to the cylinders, a manual valve in series with a portion of the selector valve for additionally controlling the application of vacuum, fluid pressure operated valves for venting the cylinders, a piston connected to the selector valve and operating in a cylinder, a valve controlled by the speed of the vehicle for controlling the application of vacuum to the valve piston, and means for admitting air selectively to the cylinders to free the pistons for movement on the application of vacuum.

3. In an automotive vehicle, transmission gear shifting mechanism including in combination fluid pressure operated pistons operating in cylinders to selectively shift the transmission gears, a selector valve controlling the application of vacuum to the cylinders, a manual valve in series with a portion of the selector valve for additionally controlling the application of vacuum, fluid pressure operated valves for venting the cylinders, a piston connected to the selector valve and operating in a cylinder, a valve controlled by the speed of the vehicle for controlling the application of vacuum to the valve piston, manually operated means for optionally controlling the application of vacuum to the valve piston, and means for admitting air selectively to the cylinders to free the pistons for movement on the application of vacuum.

4. In an automotive vehicle, transmission gear shifting mechanism including in combination fluid pressure operated pistons operating in cylinders to selectively shift the transmission gears, a selector valve controlling the application of vacuum to the cylinders, a manual valve in series with a portion of the selector valve for additionally controlling the application of vacuum, fluid pressure operated valves for venting the cylinders, a piston connected to the selector valve for moving it in either direction and operating in a cylinder, a valve controlled by the speed of the vehicle for controlling the application of vacuum to the sides of the valve piston to move it in one direction or another, a manually operated detent for holding the valve piston in an intermediate position, and means for admitting air selectively to the cylinders to free the pistons for movement on the application of vacuum.

5. In an automotive vehicle, transmission gear shifting mechanism including in combination fluid pressure operated pistons operating in cylinders to selectively shift the transmission gears, a selector valve controlling the application of vacuum to the cylinders, a manual valve in series with a portion of the selector valve for additionally controlling the application of vacuum, fluid pressure operated valves for venting the cylinders, a piston connected to the selector valve for moving it in either direction and operating in a cylinder, a valve controlled by the speed of the vehicle for controlling the application of vacuum to the sides of the valve piston to move it in one direction or another, a manually operated detent for holding the valve piston in an intermediate position, additional manually operated means for controlling the application of vacuum to the valve piston, and means for admitting air selectively to the cylinders to free the pistons for movement on the application of vacuum.

6. In an automotive vehicle, transmission gear shifting mechanism including in combination fluid pressure operated pistons operating in cylinders to selectively shift the transmission gears, a selector valve controlling the application of vacuum to the cylinders, a manual valve in series with a portion of the selector valve for additionally controlling the application of vacuum and fluid pressure operated valves for venting the cylinders, a piston connected to the selector valve for moving it in either direction and operating in a cylinder, a valve controlled by the speed of the vehicle for controlling the application of vacuum to the sides of the valve piston to move it in one direction or another, a manually operated detent for holding the valve piston in an intermediate position and connected to a clutch pedal for operation, additional manually operated means for varying the application of vacuum to the valve piston to move the selector valve to its intermediate position from any of its other positions, and means for admitting air selectively to the cylinders to free the pistons for movement on the application of vacuum.

7. In an automotive vehicle, transmission gear shifting mechanism including vacuum operated pistons operating in cylinders and powered by suction of the intake manifold of an internal combustion engine, a selector valve selectively controlling the application of the intake suction to the pistons, a piston operating in a cylinder and connected to move the selector valve in either direction by suction, a valve controlled by the speed of the vehicle and controlling the direction of movement of the valve piston by suction and a check valve intermediate the selector valve and intake manifold permitting the flow of air in only one direction.

PHILIP M. CARTER.
LOUIS A. LARSEN.
DOUGLAS F. LINSLEY.